United States Patent [19]

Nagaoka

[11] Patent Number: 5,015,413

[45] Date of Patent: May 14, 1991

[54] ELECTRICALLY CONDUCTIVE POLYORGANOSILOXANE PRIMER COMPOSITION

[75] Inventor: Hisayuki Nagaoka, Gunma, Japan

[73] Assignee: Toshiba Silicone Co., Ltd., Tokyo, Japan

[21] Appl. No.: 486,446

[22] Filed: Feb. 28, 1990

[30] Foreign Application Priority Data

Feb. 28, 1989 [JP] Japan .................................. 1-48133

[51] Int. Cl.$^5$ .......................... H01B 1/06; H01B 1/02; C08J 3/08
[52] U.S. Cl. .................................... 252/511; 252/518; 252/520; 252/513; 252/512; 252/514; 524/439; 524/440; 524/409; 524/413; 528/14; 528/15
[58] Field of Search ............... 252/511, 518, 520, 513, 252/514, 512; 524/439, 440, 409, 413; 528/14, 15

[56] References Cited

U.S. PATENT DOCUMENTS

| | | | |
|---|---|---|---|
| 4,062,813 | 12/1977 | Andrianov et al. | 252/511 |
| 4,130,707 | 12/1978 | Leiser et al. | 252/512 |
| 4,273,697 | 6/1981 | Sumimura et al. | 252/511 |
| 4,777,205 | 10/1988 | LaScola et al. | 252/511 |
| 4,904,414 | 2/1990 | Peltz et al. | 252/518 |

FOREIGN PATENT DOCUMENTS 0110371  6/1984  European Pat. Off. ............ 252/511

*Primary Examiner*—Josephine Barr
*Assistant Examiner*—Bradley A. Swope
*Attorney, Agent, or Firm*—Sughrue, Mion, Zinn, Macpeak & Seas

[57] ABSTRACT

A primer composition comprising (A) a solvent-soluble polyorganosiloxane consisting essentially of $R^1SiO_{3/2}$ units and $R^1SiO$ units in a specific ratio, (B) an organosiloxane and/or a partial hydrolysis condensate thereof, the organosiloxane having more than two silicon-bonded hydrolyzable groups per molecule, (C) an electroconductive filler, (D) a curing catalyst, and (E) an organic solvent. The primer composition shows good coating properties and excellent storage stability. Primer film obtained from the primer composition has various excellent properties such as adhesiveness, electroconductivity, heat resistance and moisture resistance.

7 Claims, No Drawings

ELECTRICALLY CONDUCTIVE POLYORGANOSILOXANE PRIMER COMPOSITION

FIELD OF THE INVENTION

The present invention relates to a primer composition used for improving the adhesion properties of electroconductive silicone sealants. More particularly, it relates to a primer composition which improves the adhesion of electroconductive silicone sealants to wall, flooring, or ceiling materials in clean room and also maintains good electroconductivity between the sealants and those materials.

BACKGROUND OF THE INVENTION

With recent developments in electronics, various kinds of electrical and electronic machines and apparatus are being manufactured in large quantities. In parts factories and assembling factories for producing such machines, clean rooms are being employed increasingly. If electrostatic charges are generated in materials inside the clean rooms, the charges should be immediately leaked to prevent the clean rooms from being electrically charged. For this purpose, clean rooms are generally made electroconductive by providing an electroconductive coating or the like on the surfaces of wall and ceiling materials, and by filling flooring materials with electroconductive fillers. Due to such walls, ceiling, and flooring, the electronic machines and parts in a clean room are prevented from suffering burning damages due to the discharge of electrostatic charges generated in the inside of the clean room, and dust particles are prevented from adhering to the inside of the room and lowering the cleanness in the room.

Joints in such wall, flooring, and ceiling materials are caulked with silicone sealants. As such sealants, silicone sealants having electroconductivity have come into use because general-purpose silicone sealants show insulation properties and are easily charged to cause dust particles to adhere to the joints.

However, since wall and ceiling materials have been covered with an electroconductive coating (for example, SEKISUI ASVEIL SA-1000 series; trade name; manufactured by Sekisui Chemical Co., Ltd., Japan) as described above and flooring materials contain special electroconductive fillers in large amount, the silicone sealants inherently show poor adhesion to these antistatic materials. In addition, since the electroconductive silicone sealants also contain a large proportion of an electroconductive filler such as carbon, their adhesion to joint portions of the antistatic materials is poor. Hence, satisfactory caulking of the joints with electroconductive silicone sealants has not been achieved.

SUMMARY OF THE INVENTION

As a result of intensive studies to overcome the above problem, it has been found that a primer composition comprising as a base polymer a solvent-soluble polysiloxane consisting essentially of $R^1SiO_{3/2}$ units and $R^1_2SiO$ units in a specific ratio shows a good adhesion-improving effect while maintaining electroconductivity, when used in pretreatment for the adhesion of electroconductive silicone sealants to antistatic materials. The present invention has been completed based on this finding.

Accordingly, an object of the present invention is to provide a primer composition which can improve the adhesion and electroconductivity between electroconductive silicone sealants and antistatic materials, thus eliminating the above-described problem accompanying the combination of the sealants with antistatic materials.

DETAILED DESCRIPTION OF THE INVENTION

The primer composition of the present invention comprises (A) 100 parts by weight of a solvent-soluble polyorganosiloxane consisting essentially of $R^1SiO_{3/2}$ units and $R^1_2SiO$ units, wherein $R^1$ which may be the same or different each represents a substituted or unsubstituted monovalent hydrocarbon group, and having at least two silicon-bonded hydroxyl groups per molecule, the molar ratio of the $R^1SiO_{3/2}$ units to the $R^1_2SiO$ units being from 100:4 to 100:20, (B) 1 to 100 parts by weight of an organosilane and/or a partial hydrolysis condensate thereof, the organosilane having more than two silicon-bonded hydrolyzable groups per molecule, (C) 0 to 800 parts by weight of an electroconductive filler, (D) 0.01 to 10 parts by weight of a curing catalyst, and (E) an organic solvent.

The polyorganosiloxane, component (A) in this invention, is the major essential component for greatly improving the adhesion between electroconductive silicone sealants and wall, flooring, and ceiling materials in clean rooms and also improving the electroconductivity between the sealants and these materials. This component (A) consists essentially of $R^1SiO_{3/2}$ units and $R^1_2SiO$ units and has at least two silicon-bonded hydroxyl groups per molecule. In component (A), the amount of $R^1_2SiO$ units is from 4 to 20 moles, preferably 8 to 15 moles, per 100 moles of $R^1SiO_{3/2}$ units. If the amount of $R^1_2SiO$ units is below 4 moles, the pliability of primer films obtained from the primer composition is impaired and the stability of the primer composition becomes poor. If the amount thereof exceeds 20 moles, the primer composition becomes poor in adhesion-improving effect and electroconductivity of the primer firm. The groups of $R^1$ in the units may be the same or different and independently represent a substituted or unsubstituted monovalent hydrocarbon group. Preferred examples of $R^1$ include an alkyl group having 1 to 8 carbon atoms such as methyl, ethyl, propyl, isopropyl, or butyl; an alkenyl group having 2 to 3 carbon atoms such as vinyl; and a phenyl group.

The molecular weight of this polyorganosiloxane is not particularly limited, but is preferably in the range of from 5,000 to 50,000. Such polyorganosiloxane can generally be synthesized by the hydrolytic polycondensation reaction of $R^1SiCl_3$ or a partial hydrolysis condensate thereof with $R^1_2SiCl_2$ or a partial hydrolysis condensate thereof, or by the hydrolyzable polycondensation reaction of $R^1_2SiY_3$ (Y is a hydrolyzable group directly bonded to the silicon atom) or a partial hydrolysis condensate thereof with $R^1_2SiZ_2$ (Z is a hydrolyzable group directly bonded to the silicon atom) or a partial hydrolysis condensate thereof. The hydrolytic polycondensation reaction is conducted in the presence of an organic solvent such as toluene or xylene.

The organosilane and/or its partial hydrolysis condensate, component (B) in this invention, acts as a hydrolyzable crosslinking agent to undergo a condensation reaction with component (A) in the presence of the curing catalyst (D). This component (B) should have more than two silicon-bonded hydrolyzable groups per molecule. Examples of such hydrolyzable group include an alkoxy group such as methoxy, ethoxy, propoxy, isopropoxy, or butoxy; an enoxy group such as propenoxy; an acyloxy group such as acetoxy or benzoxy; an organooxime group such as acetone oxime or butanone oxime; an organoaminoxy group such as dimethylaminoxy or diethylaminoxy; an organoamino group such as dimethylamino, diethylamino, or cyclohexylamino; an organoamido group such as N-methylacetamido; and an isocyanate group. In component (B), the silicon-bonded organic groups other than the above hydrolyzable groups are substituted or unsubstituted monovalent hydrocarbon groups, and examples thereof are the same groups as in the above-described $R^1$ in component (A).

Specific examples of component (B) include alkoxy group-containing silanes such as methyltrimethoxysilane, vinyltrimethoxysilane, methyltriethoxysilane, vinyltriethoxysilane, ethyl orthosilicate, and propyl orthosilicate; enoxy group-containing silanes such as methyltripropenoxysilane; acyloxy group-containing silanes such as methyltriacetoxysilane, vinyltriacetoxysilane, methyltribenzoxysilane, and diacetoxydibutoxysilane; isocyanate group-containing silanes such as tetraisocyanatosilane; oxime group-containing silanes such as methyltris(butanone oxime)silane; aminooxy group-containing silanes such as methyltris(dimethylaminooxy)silane, and methyltris(diethylaminooxy)silane; amino group-containing silanes such as methyltris(dimethylamino)silane, methyltris(diethylamino)silane, and methyltris(cyclohexylamino)silane; amide group-containing silanes such as methyltris(N-methylacetamido)silane and vinyltris(N-methylacetamido)silane; and low-polymerization-degree siloxane compounds obtained by partial hydrolysis condensation of the above silanes.

The amount of component (B) in the primer composition is from 1.0 to 100 parts by weight, preferably 5 to 50 parts by weight, per 100 parts by weight of component (A). If the amount of component (B) is below 1.0 part by weight, the resulting primer composition shows poor adhesion properties because it cannot undergo sufficient crosslinking. On the other hand, if the amount thereof exceeds 100 parts by weight, primer films formed from the resulting primer composition become brittle and low in strength, and the primer composition gels with the lapse of time to impair storage stability.

According to the present invention, the electroconductive filler, component (C), may be or may not be added to the primer composition. Even without such filler, the effects of this invention can be obtained as can be seen from Examples 1 to 4 described after. However, the electroconductivity of primer films can be further enhanced by incorporation of the filler as can be seen from Examples 5 to 8 described after. Examples of such filler include carbon black such as acetylene black or furnace black, graphite, titanium oxide surface-treated with antimony oxide-tin oxide, potassium titanate surface-treated with the same, metal oxide such as antimony oxide-tin oxide, and metal such as silver or nickel. The shape of the filler may be any of particulate, flaky, and fibrous. The amount of component (C) in the primer composition should be 800 parts by weight or less, preferably 500 parts by weight or less, per 100 parts by weight of component (A). An amount thereof exceeding 800 parts by weight is not preferred in that the resulting primer composition shows poor workability when used. For imparting more improved electroconductivity to a primer firm obtained from the primer composition, the amount of component (C) is preferably 1.0 part by weight or more per 100 parts by weight of component (A).

The curing catalyst, component (D), used in this invention acts as a catalyst to promote the curing of the primer composition when the organosilane and/or its partial hydrolysis condensate, component (B), hydrolyzes by moisture in the air to cause a crosslinking reaction.

Examples of the curing catalyst include metal salts of carboxylic acids such as iron octoate, cobalt octoate, manganese octoate, zinc octoate, tin naphthenate, tin caprylate, and tin oleate; organotin compounds such as dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxysiloxy)tin, and dioctyltin dilaurate; metal chlorides such as ferric chloride; and metal oxides such as lead dioxide. Of these, ferric chloride and lead dioxide are preferred from the standpoint of electroconductivity.

The amount of component (D) in the primer composition is from 0.01 to 10 parts by weight, preferably 0.1 to 1 part by weight, per 100 parts by weight of component (A). If the amount of component (D) is below 0.01 part by weight, a sufficient catalytic action cannot be exerted, while if the amount thereof exceeds 10 parts by weight, the adhesion properties and storage stability of the primer composition are adversely affected.

The organic solvent, component (E) in this invention, serves to dissolve, dilute, or disperse components (A) to (D) to give a primer composition having an appropriate viscosity so as to control the thickness of cured primer films and the drying time of primer coatings applied, and also serves to impart storage stability to the primer composition. For these purposes, the amount of component (E) added to the composition is preferably from 10 to 2,000 parts by weight per 100 parts by weight of component (A). Examples of component (E) include benzene, toluene, xylene, n-hexane, cyclohexane, acetone, methyl ethyl ketone, methanol, ethanol, propanol, isopropanol, butanol, isobutanol, and amyl alcohol.

The primer composition of the present invention comprises the above-described components (A) to (E). Besides these five components, additives such as a dye or pigment for coloring the composition and a heat resistance improver may be suitably added to the composition if desired and necessary, so long as the object of the invention is not defected.

The primer composition of the present invention can be prepared by merely mixing the above-described essential components (A) to (E), and if necessary, other additives. Further, the primer composition of the present invention by itself does not have an electroconductivity, but when cured, the cured product (cured primer film) has an electroconductivity.

Electroconductive silicone sealants can be made to show strong adhesion to antistatic materials in clean rooms, such as wall, flooring, and ceiling materials, by applying the primer composition of this invention to the joints in these antistatic materials, drying the composition applied, caulking the resulting joints with the electroconductive silicone sealant, and then curing the sealant applied. In addition, good electroconductivity can be obtained between the electroconductive silicone sealant and the antistatic materials. Such strong adhesion and good electroconductivity can be maintained for a long period of time even after immersion in water, and the primer films formed from the primer composition of this invention have excellent heat and moisture resistance. Furthermore, the primer composition of this invention shows good coating properties so that it can be applied uniformly, and also has excellent storage stability.

The present invention will be explained below in more detail by reference to the following Examples and Comparative Examples, in which all parts are by weight.

EXAMPLE 1

The ingredients shown in Table 1 were blended and mixed by stirring to obtain primer compositions Ex.1 to Ex.3. These primer compositions Ex.1 to Ex.3 were coated on three kinds of materials (calcium silicate plate, glass plate, and acrylic plate, all coated with an electroconductive paint composed of an epoxy resin and a silver powder blended therewith) for use in clean rooms, and then air-dried. On the plates thus treated with Ex.1 to Ex.3, carbon-containing alcohol-type electroconductive silicone adhesive sealant TCM7101 (manufactured by Toshiba Silicone Co., Ltd.), which cures by loss of alcohol, was applied to prepare H-shaped tensile test pieces as specified in JIS A5758. The tensile test pieces were aged for curing at 20° C., 55% RH for 7 days, and then examined for electroconductivity and adhesiveness under ordinary conditions (20° C., 55%RH).

The electroconductivity was evaluated by measuring the volume resistivity between the plates, and the adhesiveness was evaluated by determining the maximum tensile stress in a tensile test (rate of pulling: 10 mm/min). Further, failure percentage means the areal percentage of cohesive failure to all failure(s); for example, a cohesive failure percentage of 100 indicates that the interfacial bonding strength is higher than the cohesive strength of the sealant due to application of the primer. These measurements are hereinafter the same.

The results obtained are shown in Table 1 below.

COMPARATIVE EXAMPLE 1

For the sake of comparison with Example 1, comparative primer compositions Ref.1 to Ref.4 were obtained by blending and stirring the ingredients shown in Table 1. In the same manner as in Example 1, H-shaped tensile test pieces were prepared and examined for electroconductivity and adhesiveness.

The results obtained are shown in Table 1 below.

TABLE 1

| | | Primer Composition | | | | | | |
|---|---|---|---|---|---|---|---|---|
| | | Ex. 1 | Ex. 2 | Ex. 3 | Ref. 1 | Ref. 2 | Ref. 3 | Ref. 4 |
| Formulation (parts by weight) | | | | | | | | |
| (A) | Polysiloxane[*1] [molecular weight 15,000] | | | | | | | |
| | $MeSiO_{3/2}:Me_2SiO =$ 1:0.1 [molar ratio] | 100 | 100 | 100 | | | | |
| | $MeSiO_{3/2}:Me_2SiO =$ 1:0.3 [molar ratio] | | | | 100 | | | |
| | $SiO_2:Me_3SiO_{1/2} =$ 1:0.1 [molar ratio] | | | | | 100 | | |
| | $MeSiO_{3/2}:Me_3SiO_{1/2} =$ 1:0.1 [molar ratio] | | | | | | 100 | |
| | $SiO_2:Me_2SiO:Me_3SiO_{1/2} =$ 1:0.1:0.1 | | | | | | | 100 |
| (B) | $MeSi(OMe)_3$[*1] | 15 | 17.5 | 25 | 17.5 | 17.5 | 17.5 | 17.5 |
| (C) | Electroconductive filler | 0 | 0 | 0 | 0 | 0 | 0 | 0 |
| (D) | $FeCl_3$ | 0.1 | 0.12 | 0.2 | 0.12 | 0.12 | 0.12 | 0.12 |
| (E) | Acetone/xylene mixed solvent [1:1 by weight] | 600 | 600 | 600 | 600 | 600 | 600 | 600 |
| Results under ordinary conditions[*2] | | | | | | | | |
| Volume resistivity ($\Omega \cdot cm$) | | | | | | | | |
| Adherend P[*3] | | $1.0 \times 10^8$ | $2.5 \times 10^8$ | $7.5 \times 10^8$ | $6 \times 10^{11}$ | $5 \times 10^{15}$ | $2 \times 10^{14}$ | $7.5 \times 10^{15}$ |
| Adherend Q[*3] | | $3 \times 10^4$ | $5 \times 10^4$ | $1 \times 10^5$ | $1 \times 10^9$ | $1 \times 10^{13}$ | $3.5 \times 10^{12}$ | $6 \times 10^{13}$ |
| Adherend R[*3] | | $7 \times 10^3$ | $1 \times 10^4$ | $2.5 \times 10^4$ | $4 \times 10^9$ | $8 \times 10^{14}$ | $9 \times 10^{13}$ | $2.5 \times 10^{15}$ |
| Maximum tensile stress ($kgf/cm^2$) | | | | | | | | |
| Adherend P[*3] | | 25.7 | 26.0 | 24.0 | 21.5 | 15.1 | 14.5 | 16.8 |
| Adherend Q[*3] | | 26.5 | 27.2 | 25.3 | 24.5 | 18.5 | 17.1 | 19.1 |
| Adherend R[*3] | | 25.0 | 25.6 | 21.5 | 17.4 | 14.5 | 14.4 | 15.2 |
| Cohesive failure (%) | | | | | | | | |
| Adherend P[*3] | | 100 | 100 | 100 | 75 | 0 | 0 | 0 |
| Adherend Q[*3] | | 100 | 100 | 100 | 80 | 0 | 0 | 0 |
| Adherend R[*3] | | 100 | 100 | 100 | 60 | 0 | 0 | 0 |

[*1]: Me indicates $CH_3$ group.
[*2]: Aging conditions for test piece; 20° C., 55% RH, 7 days.
[*3]: P - Calcium silicate plate coated with electroconductive paint.
  Q - Glass plate coated with electroconductive paint.
  R - Acrylic plate coated with electroconductive paint.

The results shown Table 1 above show that good electroconductivity and adhesiveness were obtained in all the test pieces prepared in Example 1 by using primer compositions Ex.1 to Ex.3, whereas the test pieces prepared in Comparative Example 1 by using primer compositions Ref.1 to Ref.4 showed inferior electroconductivity and poor adhesiveness.

EXAMPLE 2

Each of primer compositions Ex.1 to Ex.3 prepared in Example 1 was applied on the same types of plate materials as in Example 1 and then air-dried. On the resulting plate materials, carbon-containing oxime-type electroconductive silicone adhesive sealant TCM7121 (manufactured by Toshiba silicone Co., Ltd.) was applied to prepare H-shaped tensile test pieces. The test pieces thus prepared were aged for curing at 20° C., 55% RH for 7 days, and then examined for electroconductivity and adhesiveness under ordinary conditions and after immersion in 50° C. water for 3 days.

The results obtained are shown in Table 2 below.

molar ratio of the former to the latter being 100:8, and having a molecular weight of 10,000 were added 32.5 parts of $CH_2=CHSi(ON=C(CH_3)(C_2H_5))_3$, 0.18 part of $PbO_2$, 250 parts of methyl ethyl ketone, and 250 parts of butanol. The resulting mixture was mixed by stirring to obtain a primer composition. This primer composition was coated on calcium silicate plates coated with the same electroconductive paint as used in Example 1 and then air-dried. On the thus-treated plates, carbon-containing oxime-type electroconductive silicone adhesive sealant TCM7121 (manufactured by Toshiba Silicone Co., Ltd.) was applied and cured to prepare H-shaped tensile test pieces. The thus-prepared test pieces were heated at 50° C. for 3,000 hours, and then exam-

TABLE 2

| | Primer Composition | | | | | | | | |
|---|---|---|---|---|---|---|---|---|---|
| | Ex. 1 Adherend*[1] | | | Ex. 2 Adherend*[1] | | | Ex. 3 Adherend*[1] | | |
| | P | Q | R | P | Q | R | P | Q | R |
| Results under ordinary conditions*[2] | | | | | | | | | |
| Volume resistivity ($\Omega \cdot$ cm) | $1.5 \times 10^8$ | $4 \times 10^4$ | $8 \times 10^3$ | $3.0 \times 10^8$ | $5 \times 10^4$ | $1 \times 10^4$ | $8.0 \times 10^8$ | $2 \times 10^5$ | $2.5 \times 10^4$ |
| Maximum tensile stress (kgf/cm$^2$) | 34.8 | 36.5 | 34.0 | 35.5 | 37.1 | 35.0 | 34.0 | 35.9 | 33.3 |
| Cohesive failure (%) | 100 | 100 | 100 | 100 | 100 | 100 | 100 | 100 | 100 |
| Results after immersion in water*[3] | | | | | | | | | |
| Volume resistivity ($\Omega \cdot$ cm) | $0.9 \times 10^8$ | $3.5 \times 10^4$ | $7.2 \times 10^3$ | $2.8 \times 10^8$ | $4 \times 10^4$ | $0.7 \times 10^4$ | $7.3 \times 10^8$ | $1 \times 10^5$ | $2.0 \times 10^4$ |
| Maximum tensile stress (kgf/cm$^2$) | 27.8 | 32.9 | 23.8 | 28.4 | 33.4 | 24.5 | 27.2 | 32.3 | 23.3 |
| Cohesive failure (%) | 100 | 100 | 100 | 100 | 100 | 100 | 100 | 100 | 100 |

*[1]: P - Calcium silicate plate coated with electroconductive paint.
　Q - Glass plate coated with electrocondutive paint.
　R - Acrylic plate coated with electroconductive paint.
*[2]: Aging condition for test piece; 20° C., 55% RH, 7 days.
*[3]: Water-immersion treatment conditions for test piece; 50° C.-water, 3 days.

There is no substantial change in the electroconductivity of the test pieces prepared by using primer compositions Ex.1 to Ex.3 between the measurement under ordinary conditions and that after immersion in water. Further, the adhesiveness thereof is also good even after immersion in water, with 100% cohesive failure.

EXAMPLE 3

To 100 parts of a polyorganosiloxane consisting essentially of $CH_2=CHSiO_{3/2}$ units and $(CH_2=CH)_2SiO$ units, the molar ratio of the former to the latter being 100:14, and having a molecular weight of 29,500 were added 9.5 parts of $C_6H_5Si(OC_2H_5)_3$, 0.07 part of $FeCl_3$, 350 parts of acetone, and 350 parts of isopropyl alcohol. The resulting mixture was mixed by stirring to obtain a primer composition. This primer composition was coated on glass plates coated with the same electroconductive paint as used in Example 1 and then air-dried. On the resulting plates, carbon-containing alcohol-type electroconductive silicone adhesive sealant TCM7101 (manufactured by Toshiba Silicone Co., Ltd.) was applied to prepare H-shaped tensile test pieces. The thus-prepared test pieces were subjected to 500 hour irradiation in a sunshine weatherometer, and then examined for electroconductivity and adhesiveness. As a result, it was found that the volume resistivity was $7 \times 10^4$ $\Omega\cdot$cm, the maximum tensile stress was 27.6 kgf/cm$^2$, and the cohesive failure was 100%.

EXAMPLE 4

To 100 parts of a polyorganosiloxane consisting essentially of $C_6H_5SiO_{3/2}$ units and $(C_6H_5)_2SiO$ units, the ined for electroconductivity and adhesiveness. As a result, the test pieces showed good properties of the volume resistivity: $1.5 \times 10^9$ $\Omega\cdot$cm, the maximum tensile stress: 34.6 kgf/cm$^2$, and the cohesive failure: 100%.

EXAMPLE 5

The ingredients shown in Table 3 were blended by stirring to obtain primer compositions Ex.4 to Ex.6. These primer compositions Ex.4 to Ex.6 were coated on various materials shown in Table 3 for use in clean rooms and then air-dried. On the materials thus treated with Ex.4 to Ex 6, carbon-containing alcohol-type electroconductive silicone adhesive sealant TCM7101 (manufactured by Toshiba Silicone Co., Ltd.) was applied to prepare H-shaped tensile test pieces as specified in JIS A5758. The tensile test pieces were aged for curing at 20° C., 55% RH for 7 days, and then examined for electroconductivity and adhesiveness under ordinary conditions.

The results obtained are shown in Table 3 below.

COMPARATIVE EXAMPLE 2

For the sake of comparison with Example 5, comparative primer compositions Ref.5 to Ref.8 were obtained by blending the ingredients shown in Table 3 by stirring. In the same manner as in Example 1, H-shaped tensile test pieces were prepared and examined for electroconductivity and adhesiveness.

The results obtained are shown in Table 3.

TABLE 3

| | Primer Composition | | | | | | |
|---|---|---|---|---|---|---|---|
| | Ex. 4 | Ex. 5 | Ex. 6 | Ref. 5 | Ref. 6 | Ref. 7 | Ref. 8 |
| Formation (parts by weight) | | | | | | | |
| (A) Polysiloxane[*1] [molecular weight 15,000] | | | | | | | |
| $MeSiO_{3/2}:Me_2SiO =$ 1:0.1 [molar ratio] | 100 | 100 | 100 | | | | |
| $MeSiO_{3/2}:Me_2SiO =$ 1:0.3 [molar ratio] | | | | 100 | | | |
| $SiO_2:Me_3SiO_{1/2} =$ 1:0.1 [molar ratio] | | | | | 100 | | |
| $MeSiO_{3/2}:MeSiO_{1/2} =$ 1:0.1 [molar ratio] | | | | | | 100 | |
| $SiO_2:Me_2SiO:Me_3SiO_{1/2} =$ 1:0.1:0.1 | | | | | | | 100 |
| (B) $MeSi(OMe)_3$[*1] | 26.3 | 31.9 | 17.5 | 17.5 | 17.5 | 17.5 | 17.5 |
| (C) Electroconductive filler[*2] | F 36 | G 359 | H 180 | H 180 | H 180 | H 180 | H 180 |
| (D) $FeCl_3$ | 0.18 | 0.15 | 0.12 | 0.12 | 0.12 | 0.12 | 0.12 |
| (E) Acetone/xylene mixed solvent [1:1 by weight] | 600 | 600 | 600 | 600 | 600 | 600 | 600 |
| **Results under ordinary conditions[*3]** | | | | | | | |
| Volume resistivity ($\Omega \cdot cm$) | | | | | | | |
| Adherend P[*4] | $4 \times 10^7$ | $1 \times 10^8$ | $9 \times 10^7$ | $2 \times 10^{11}$ | $2 \times 10^{15}$ | $7 \times 10^{13}$ | $2.7 \times 10^{15}$ |
| Adherend Q[*4] | $1 \times 10^3$ | $8 \times 10^3$ | $6 \times 10^3$ | $1 \times 10^8$ | $1 \times 10^{12}$ | $4 \times 10^{11}$ | $7 \times 10^{12}$ |
| Adherend S[*4] | 35 | 60 | 50 | $8 \times 10^5$ | $8.5 \times 10^9$ | $3 \times 10^9$ | $6 \times 10^{10}$ |
| Maximum tensile stress (kgf/cm$^2$) | | | | | | | |
| Adherend P[*4] | 26.7 | 26.4 | 26.5 | 22.0 | 15.4 | 14.8 | 17.2 |
| Adherend Q[*4] | 27.5 | 27.4 | 27.5 | 24.8 | 18.7 | 17.2 | 19.3 |
| Adherend S[*4] | 27.6 | 27.6 | 27.6 | 17.8 | 14.8 | 14.7 | 15.5 |
| Cohesive failure (%) | | | | | | | |
| Adherend P[*4] | 100 | 100 | 100 | 80 | 10 | 5 | 10 |
| Adherend Q[*4] | 100 | 100 | 100 | 80 | 0 | 0 | 5 |
| Adherend S[*4] | 100 | 100 | 100 | 67 | 5 | 5 | 5 |

[*1]: Me indicates $CH_3$ group.
[*2]: F - Acetylene black (average particle diameter: 0.08 μm),
   G - Titanium oxide-tin oxide-antimony oxide (average particle diameter: 0.2 μm),
   H - Tin oxide-antimony oxide (average particle diameter: 0.1 μm).
[*3]: Aging conditions for test piece; 20° C., 55% RH, 7 days.
[*4]: P - Calcium silicate plate coated with electroconductive paint.
   Q - Glass plate coated with electroconductive paint.
   S - Aluminum plate.

The results in Table 3 above show that high electroconductivity and adhesiveness were obtained in all the test pieces prepared in Example 5 by using primer compositions Ex.4 to Ex.6, whereas the test pieces prepared in Comparative Example 2 by using primer compositions Ref.5 to Ref.8 showed low or substantially no electroconductivity and poor adhesiveness.

EXAMPLE 6

Each of primer compositions Ex.4 to Ex.6 prepared in Example 5 was applied on the same materials as in Example 5 and then air-dried. On the resulting materials, carbon-containing oxime-type electroconductive silicone adhesive sealant TCM7121 (manufactured by Toshiba Silicone Co., Ltd.), was applied to prepare H-shaped tensile test pieces. The test pieces thus prepared were aged for curing at 20° C., 55% RH for 7 days, and then examined for electroconductivity and adhesiveness under ordinary conditions and after immersion in 50° C. water for 3 days.

The results obtained are shown in Table 4.

TABLE 4

| | Primer Composition | | | | | | | | |
|---|---|---|---|---|---|---|---|---|---|
| | Ex. 4 Adherend[*1] | | | Ex. 5 Adherend[*1] | | | Ex. 6 Adherend[*1] | | |
| | P | Q | S | P | Q | S | P | Q | S |
| **Results under ordinary conditions[*2]** | | | | | | | | | |
| Volume resistivity ($\Omega \cdot cm$) | $6 \times 10^7$ | $1.5 \times 10^3$ | 40 | $1.2 \times 10^8$ | 60 | $9.6 \times 10^7$ | $1 \times 10^4$ | 50 | |
| Maximum tensile stress (kgf/cm$^2$) | 36.2 | 37.9 | 37.5 | 36.0 | 37.4 | 37.7 | 37.5 | 39.0 | 38.0 |
| Cohesive failure (%) | 100 | 100 | 100 | 100 | 100 | 100 | 100 | 100 | 100 |
| **Results after immersion in water[*3]** | | | | | | | | | |
| Volume resistivity ($\Omega \cdot cm$) | $3.5 \times 10^7$ | $1.5 \times 10^3$ | 36 | $1.1 \times 10^8$ | $6.5 \times 10^3$ | 42 | $8.8 \times 10^7$ | $5 \times 10^3$ | 40 |
| Maximum tensile stress (kgf/cm$^2$) | 28.9 | 34.2 | 26.3 | 28.8 | 33.7 | 26.4 | 30.0 | 35.1 | 26.6 |

TABLE 4-continued

| | Primer Composition | | | | | | | | |
|---|---|---|---|---|---|---|---|---|---|
| | Ex. 4 Adherend*[1] | | | Ex. 5 Adherend*[1] | | | Ex. 6 Adherend*[1] | | |
| | P | Q | S | P | Q | S | P | Q | S |
| Cohesive failure (%) | 100 | 100 | 100 | 100 | 100 | 100 | 100 | 100 | 100 |

*[1]: P - Calcium silicate plate coated with electroconductive paint.
   Q - Glass plate coated with electroconductive paint.
   S - Aluminum plate.
*[2]: Aging conditions for test piece; 20° C., 55% RH, 7 days.
*[3]: Water-immersion treatment conditions for test piece; 50° C.-water, 3 days.

There is no substantial change in the electroconductivity of the test pieces prepared using primer compositions Ex.4 to Ex.6 between the measurement under ordinary conditions and that after immersion in water. The adhesiveness thereof is also good even after immersion in water, with 100% cohesive failure.

EXAMPLE 7

To 100 parts of a polyorganosiloxane consisting essentially of $CH_2=CHSiO_{3/2}$ units and $(CH_2=CH)_2SiO$ units, the molar ratio of the former to the latter being 100:14, and having a molecular weight of 29,500 were added 14.3 parts of $CH_2=CHSi(OCH_3)_3$, 410 parts of tin oxide-antimony oxide filler having an average particle diameter of 0.1 μm, 0.12 part of $FeCl_3$, 350 parts of acetone, and 350 parts of isopropyl alcohol. The resulting mixture was mixed by stirring to obtain a primer composition. This primer composition was coated on glass plates coated with the same electroconductive paint as used in Example 1 and then air-dried. On the resulting plates, carbon-containing alcohol-type electroconductive silicone adhesive sealant TCM7101 (manufactured by Toshiba Silicone Co., Ltd.) was applied to prepare H-shaped tensile test pieces. The thus-prepared test pieces were subjected to 500 hour irradiation in a sunshine weatherometer, and then examined for electroconductivity and adhesiveness. As a result, it was found that the volume resistivity was 32 Ω·cm, the maximum tensile stress was 27.4 kgf/cm$^2$, and the cohesive failure was 100%.

EXAMPLE 8

To 100 parts of a polyorganosiloxane consisting essentially of $C_6H_5SiO_{3/2}$ units and $(C_6H_5)_2SiO$ units, the molar ratio of the former to the latter being 100:8, and having a molecular weight of 10,000 were added 49 parts of $C_6H_5Si(ON=C(CH_3)(C_2H_5))_3$, 32.5 parts of acetylene black filler having a particle diameter of 0.08 μm, 0.23 part of $PbO_2$, 250 parts of methyl ethyl ketone, and 250 parts of pentanol. The resulting mixture was mixed by stirring to obtain a primer composition. This primer composition was coated on calcium silicate plates coated with the same electroconductive paint as used in Example 1 and then air-dried. On the thus-treated plates, carbon-containing oxime-type electroconductive silicone adhesive sealant TCM7121 (manufactured by Toshiba Silicone Co., Ltd.) was applied and cured to prepare H-shaped tensile test pieces. The thus-prepared test pieces were heated at 50° C. for 3,000 hours, and then examined for electroconductivity and adhesiveness. As a result, the test pieces showed good properties of the volume resistivity: 89 Ω·cm, the maximum tensile stress: 35.0 kgf/cm$^2$, and the cohesive failure: 100%.

While the invention has been described in detail and with reference to specific embodiments thereof, it will be apparent to one skilled in the art that various changes and modifications can be made therein without departing from the spirit and scope thereof.

What is claimed is:
1. A primer composition comprising:
   (A) 100 parts by weight of a solvent-soluble polyorganosiloxane consisting essentially of $R^1SiO_{3/2}$ units and $R^1_2SiO$ units, wherein $R^1$ which may be the same or different, each represents an alkyl group having 1 to 8 carbon atoms, an alkenyl group having 2 to 3 carbon atoms or a phenyl group, and having at least two silicon-bonded hydroxyl groups per molecule, the molar ratio of said $R^1SiO_{3/2}$ units to said $R^1_2SiO$ units being from 100:4 to 100:20,
   (B) 1 to 100 parts by weight of an organosilane and/or a partial hydrolysis condensate thereof, said organsilane having more than two silicon-bonded hydrolyzable groups per molecule,
   (C) 0 to 800 parts by weight of an electroconductive filler,
   (D) 0.01 to 10 parts by weight of a curing catalyst, and
   (E) an organic solvent.
2. A primer composition as claimed in claim 1, wherein the solvent-soluble polyorganosiloxane has a molecular weight of 5,000 to 50,000.
3. A primer composition as claimed in claim 1, wherein $R^1$ in the units is an alkyl group having 1 to 8 carbon atoms or an alkenyl group having 2 to 3 carbon atoms.
4. A primer composition as claimed in claim 1, wherein the hydrolyzable group in (B) is an alkoxy group, an enoxy group, an acyloxy group, an organooxime group, an organoaminoxy group, an organoamino group, an organoamide group or an isocyanate group.
5. A primer composition as claimed in claim 1, wherein the electroconductive filler is acetylene black, furnace black, graphite, titanium oxide surface-treated with antimony oxidetin oxide, potassium titanate surface-treated with antimony oxide-tin oxide, antimony oxide-tin oxide, silver or nickel.
6. A primer composition as claimed in claim 1, wherein the curing catalyst is a metal salt of carboxylic acid, an organotin compound, a metal chloride or a metal oxide.
7. A primer composition as claimed in claim 1, wherein the organic solvent is benzene, toluene, xylene, n-hexane, cyclohexane, acetone, methyl ethyl ketone, methanol, ethanol, propanol, isopropanol, butanol, isobutanol, or amyl alcohol.

* * * * *